(12) United States Patent
Dennis (10) Patent No.: US 10,516,281 B2
(45) Date of Patent: Dec. 24, 2019

(54) CHARGING APPARATUS FOR WIRELESS EARPHONE

(71) Applicant: OTTER PRODUCTS, LLC, Fort Collins, CO (US)

(72) Inventor: Jeremy L. Dennis, Fort Collins, CO (US)

( * ) Notice: Subject to any disclaimer, the term of this patent is extended or adjusted under 35 U.S.C. 154(b) by 253 days.

(21) Appl. No.: 15/696,472

(22) Filed: Sep. 6, 2017

(65) Prior Publication Data

US 2018/0083468 A1 Mar. 22, 2018

Related U.S. Application Data

(60) Provisional application No. 62/404,959, filed on Oct. 6, 2016, provisional application No. 62/397,404, filed on Sep. 21, 2016.

(51) Int. Cl.
*H02J 7/00* (2006.01)
*H04R 1/10* (2006.01)
*H02J 50/10* (2016.01)

(52) U.S. Cl.
CPC .......... *H02J 7/0054* (2013.01); *H02J 7/0042* (2013.01); *H02J 7/0044* (2013.01); *H02J 7/0047* (2013.01); *H02J 50/10* (2016.02); *H04R 1/1016* (2013.01); *H04R 1/1025* (2013.01); *H04R 1/1033* (2013.01); *H04R 1/1058* (2013.01); *H02J 2007/0096* (2013.01); *H04R 1/105* (2013.01); *H04R 2420/07* (2013.01); *H04R 2420/09* (2013.01)

(58) Field of Classification Search
CPC ...... H02J 7/0042; H02J 7/0044; H02J 7/0047; H02J 7/0054; H02J 50/10; H04R 1/1016; H04R 1/1025; H04R 1/1033; H04R 1/105
See application file for complete search history.

(56) References Cited

U.S. PATENT DOCUMENTS

| | | |
|---|---|---|
| 4,588,867 A | 5/1986 | Konomi |
| D318,473 S | 7/1991 | Miyashita et al. |
| D337,589 S | 7/1993 | Wada |
| D340,932 S | 11/1993 | Yan |
| D431,553 S | 10/2000 | Suzuki |
| D558,735 S | 1/2008 | Carr et al. |
| D582,389 S | 12/2008 | Bose et al. |

(Continued)

*Primary Examiner* — Richard Isla
*Assistant Examiner* — Johali A Torres Ruiz (57) ABSTRACT

A charging apparatus for wireless earphones includes a rechargeable battery, first and second electrical cables, and first and second charging receptacles. The first charging receptacle is electrically connected to the rechargeable battery by the first electrical cable and includes a cavity for receiving a first one of the wireless earphones. The first charging receptacle further includes first electrical contacts to electrically interface to electrical contacts of the first wireless earphone and a first audio path between an outer surface of the first charging receptacle and an inner surface of the cavity. The second charging receptacle is electrically connected to the rechargeable battery by the second electrical cable and includes a cavity for receiving a second one of the wireless earphones. The second charging receptacle further includes second electrical contacts to electrically interface to electrical contacts of the second wireless earphone. The second charging receptacle also includes an audio path.

20 Claims, 9 Drawing Sheets

(56) References Cited

U.S. PATENT DOCUMENTS

| | | |
|---|---|---|
| D582,889 S | 12/2008 | Bose et al. |
| D584,284 S | 1/2009 | Carr et al. |
| 7,548,040 B2 | 6/2009 | Lee et al. |
| D622,265 S | 8/2010 | Rye |
| D641,737 S | 7/2011 | Krauss et al. |
| 8,009,853 B2 | 8/2011 | Ito et al. |
| 8,073,181 B2 | 12/2011 | Bakalos et al. |
| D678,868 S | 3/2013 | Feng et al. |
| D686,191 S | 7/2013 | Schaal et al. |
| D694,220 S | 11/2013 | Lee et al. |
| D695,265 S | 12/2013 | Schaal et al. |
| D695,267 S | 12/2013 | Schaal et al. |
| D707,652 S | 6/2014 | Brunner et al. |
| 2005/0254778 A1* | 11/2005 | Pettersen .............. H04R 1/44 386/333 |
| 2009/0238395 A1* | 9/2009 | Jubelirer .............. H04R 1/08 381/370 |
| 2010/0320961 A1* | 12/2010 | Castillo .............. H02J 7/0044 320/107 |
| 2011/0286615 A1 | 11/2011 | Olodort et al. |
| 2014/0205108 A1 | 7/2014 | Triato |
| 2015/0215695 A1* | 7/2015 | He .............. H04R 1/1091 381/74 |
| 2016/0073188 A1 | 3/2016 | Lindén et al. |
| 2016/0112788 A1* | 4/2016 | Huang .............. H04R 1/1066 381/378 |
| 2016/0134961 A1 | 5/2016 | Shaffer |
| 2016/0219356 A1* | 7/2016 | Cheng .............. H04R 1/1025 |
| 2017/0093079 A1* | 3/2017 | Wagman .............. A45C 13/02 |
| 2017/0094394 A1 | 3/2017 | McPeak et al. |
| 2017/0094397 A1 | 3/2017 | Wagman et al. |
| 2017/0105679 A1* | 4/2017 | Gil .............. A61B 5/02055 |
| 2017/0134845 A1 | 5/2017 | Milam et al. |
| 2017/0195770 A1* | 7/2017 | Cheney .............. H04R 1/1025 |
| 2017/0264991 A1* | 9/2017 | Horst .............. H04R 1/1041 |

* cited by examiner

CHARGING APPARATUS FOR WIRELESS EARPHONE

CROSS REFERENCE TO RELATED APPLICATIONS

This application claims priority to U.S. Provisional Patent Application No. 62/404,959, filed Oct. 6, 2016, and U.S. Provisional Patent Application No. 62/397,404, filed Sep. 21, 2016, all of which are hereby incorporated by reference in their entireties.

BACKGROUND

Personal electronic devices are commonly used for communication and entertainment purposes, as well as for Internet access and for a variety of other purposes. Examples of personal electronic devices include smartphones, tablet computers, gaming devices, audio players, video players, cameras, portable computers, two-way radios, GPS receivers, and/or other portable electronic devices. People commonly use one or more earphones, headphones, headsets, earbuds, personal speakers, headsets, microphones, or similar sound generating and/or sound receiving devices along with the various types of electronic devices identified above. Increasingly, these earphones, earbuds, and the like, may receive communications from one or more of the electronic devices through a wireless data connection. Wireless earphones, earbuds, and the like, typically include a small built in power source which needs recharged periodically.

DETAILED DESCRIPTION

Personal electronic devices are commonly used for communication, and entertainment purposes, as well as for Internet access and a variety of other purposes. Examples of personal electronic devices include smartphones, tablet computers, gaming devices, audio players, video players, fitness devise, medical devices, cameras, portable computers, two-way radios, GPS receivers, and/or other portable devices. People commonly use one or more earphones, headphones, earbuds, personal speakers, headsets, microphones, or similar sound generating and/or receiving devices with these types of electronic devices. While the term 'earphone' is used in many of the examples and descriptions that follow, the improvements and techniques disclosed herein may also be utilized with any type of headphones, earbuds, personal speakers, headsets, microphones, or similar sound generating and/or receiving devices. Similarly, while many of the examples herein are discussed with respect to a pair of earphones, the improvements and techniques disclosed herein may also be utilized with a single earphone. In some examples, the disclosed improvement and techniques may also be used with similar devices that include or make use of a microphone.

Increasingly, earphones, and the like, are wireless devices which receive data and/or communications from one or more electronic devices wirelessly and/or transmit data and/or communications to one or more electronic devices wirelessly. For example, wireless earphones are often used in conjunction with a smartphone to wirelessly receive audio data from the smartphone for playback to the user through the earphones. The data may be transmitted using one or more wireless protocols including Bluetooth, Bluetooth Low Energy, proprietary protocols, and/or other formats or protocols.

The fact that the earphones are wireless gives the user more freedom because a wired connection between the earphones and the smartphone is not required. The wireless connection allows more flexibility in movement as well as in the placement or storage of the smartphone. Because they are wireless, wireless earphones typically include an integral power source which needs recharged periodically. Because it is preferred for wireless earphones to be relatively small, their power sources may also be relatively small and may require recharging relatively frequently. In some cases, they may need to be charged more frequently than the smart phone or other device they are being used with. Consequently, improved techniques, apparatuses, and/or methods of charging wireless earphones are desirable.

In one example, a charging apparatus for a pair of wireless earphones includes a rechargeable battery for storing electrical power, two charging receptacles, and one or more electrical cables. The charging receptacles are each configured for receiving a respective one of the pair of wireless earphones for charging the wireless earphones. The charging receptacles each include a cavity for receiving the respective one of the pair of wireless earphones, one or more electrical contacts for electrically interfacing to the respective wireless earphone, and an audio port providing a path for audio to travel to and/or from an audio element of the respective wireless earphone, wherein the audio path extends from inside the cavity to outside the cavity. The one or more electrical cables are attached to the one or more electrical contacts of each of the receptacles, directly or indirectly, to electrically connect the one or more electrical contacts to the rechargeable battery to provide at least a portion of the electrical power from the rechargeable battery to each of the wireless earphones when the wireless earphones are inserted into the charging receptacles.

In another example, a charging apparatus for wireless earphones includes a rechargeable battery for storing electrical power, first and second electrical cables, and first and second charging receptacles. The first charging receptacle is electrically connected to the rechargeable battery by the first electrical cable. The first charging receptacle includes a cavity configured for receiving at least a portion of a first one of the wireless earphones when the first one of the wireless earphones is installed in the first charging receptacle. The first charging receptacle further includes first electrical contacts electrically connected to the first electrical cable. The first electrical contacts are configured to electrically interface to electrical contacts of the installed first wireless earphone. The first charging receptacle further includes a first audio path between an outer surface of the first charging receptacle and an inner surface of the cavity of the first charging receptacle. The second charging receptacle is electrically connected to the rechargeable battery by the second electrical cable. The second charging receptacle includes a cavity configured for receiving at least a portion of a second one of the wireless earphones when the second one of the wireless earphones is installed in the second charging receptacle. The second charging receptacle further includes second electrical contacts electrically connected to the second electrical cable. The second electrical contacts are configured to electrically interface to electrical contacts of the installed second wireless earphone. The second charging receptacle further includes a second audio path between an outer surface of the second charging receptacle and an inner surface of the cavity of the second charging receptacle.

Figure 1:
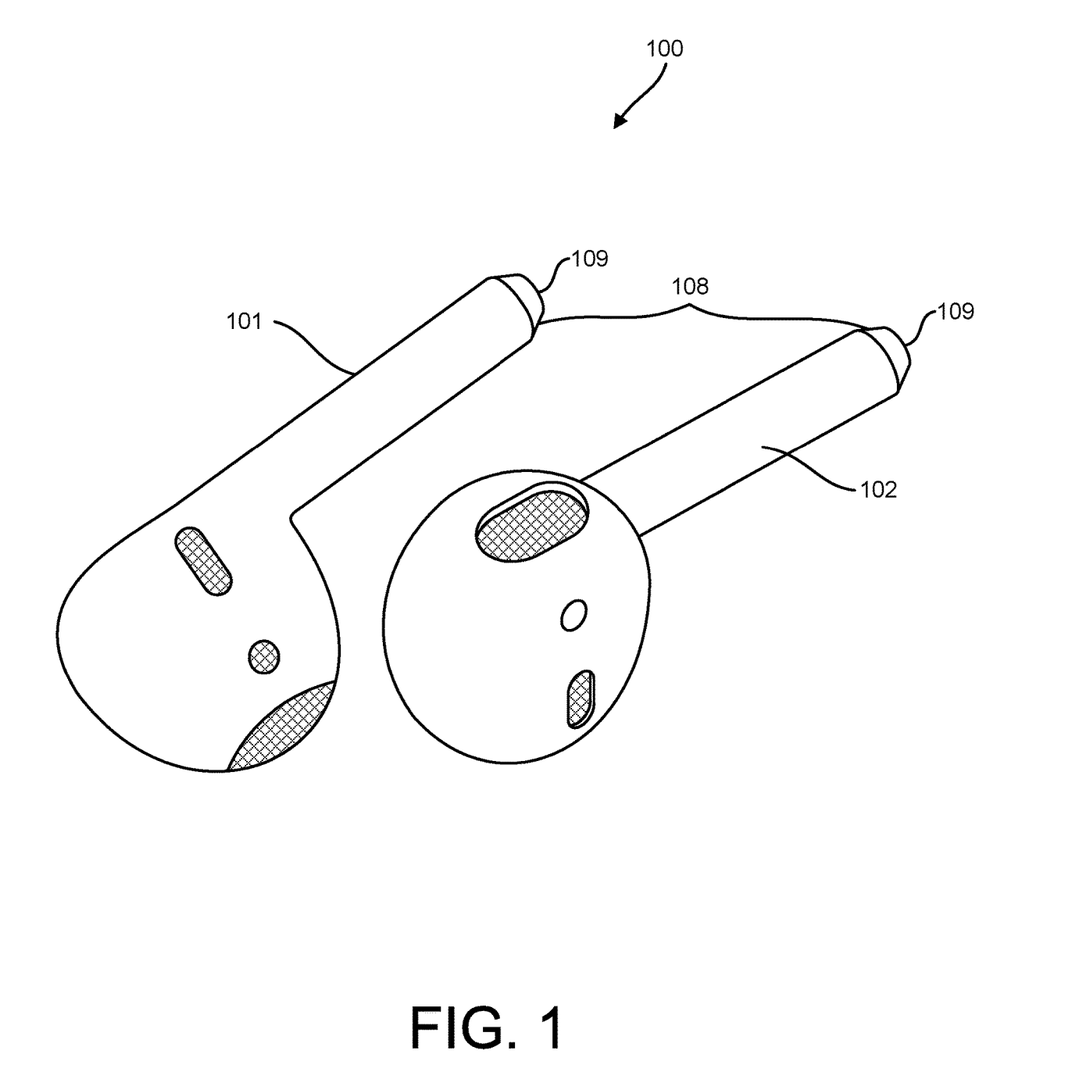
FIG. 1 illustrates a pair of wireless earphones.

FIG. 1 illustrates a pair of wireless earphones 100. The pair of wireless earphones includes wireless earphone 101 and wireless earphone 102. While many of the examples herein are described with respect to a pair of wireless earphones, the techniques disclosed herein are also applicable to uses involving only a single earphone or to uses involving more than two earphones. Wireless earphones 101 and/or 102 are placed into a user's ears and used to conduct wirelessly received audio information to the user. The audio information may be received using one or more wireless communication techniques such as Bluetooth, Bluetooth Low Energy, Bluetooth Smart, WiFi, NFC, or another wireless communication technique or protocol, including combinations thereof. In one example, wireless earphones 100 are APPLE AIRPOD headphones. However, other types, styles, and/or brands of earphones and headphones are possible.

Each of wireless earphones 101 and 102 may contain a power storage device, such as a rechargeable battery, for powering the wireless earphones. Each of wireless earphones 101 and 102 may also include one more electrical contacts 108 for receiving electrical power to recharge the power storage device of the respective earphone. Each of wireless earphones 101 and 102 may also include an audio element 109. In one example, audio element 109 includes a microphone for receiving audio information from the user for transmission to an electronic device being used with wireless earphone 101 and/or 102. In other words, wireless headphones 100 may include one or more microphones for supporting two way communication. In other examples, audio element 109 may also include a sensor or other type of electronic device.

Figure 2A:
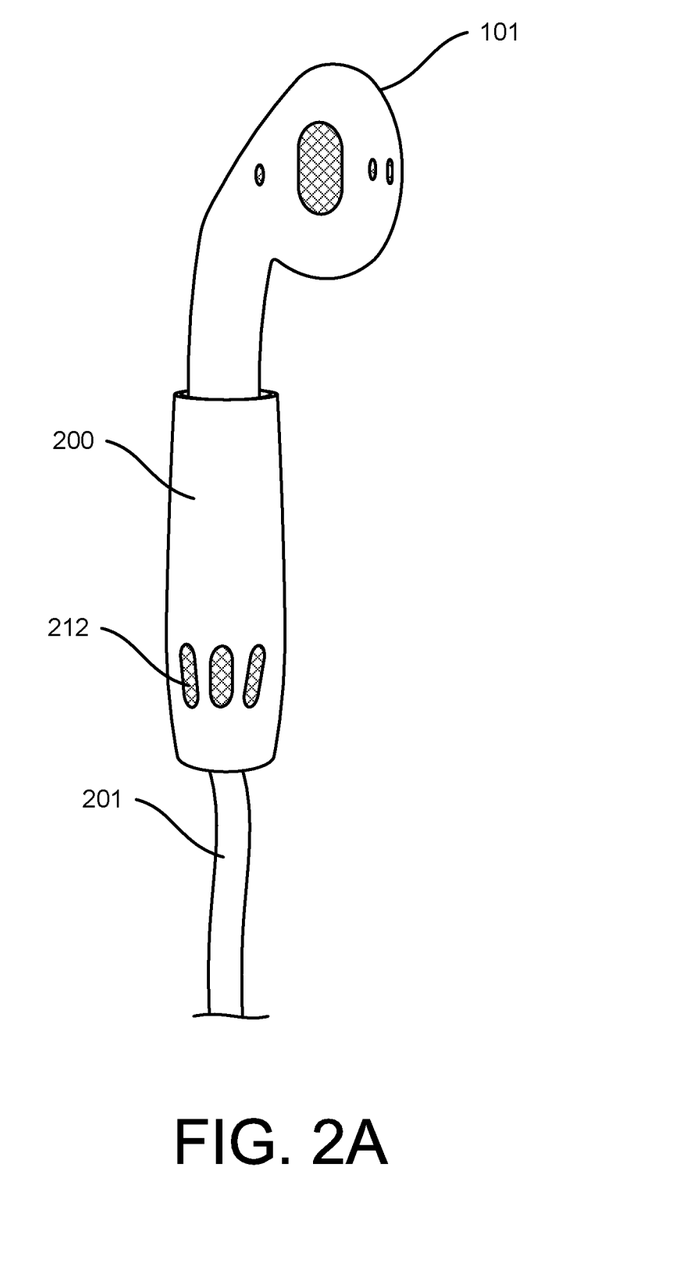
FIG. 2A illustrates a wireless earphone inserted into a charging status indicator.

In some cases, each of wireless earphones 101 and 102 may be charged using a storage box or container (not pictured) that recharges them using a power source that is internal or external to the container. In this way, the wireless earphones can conveniently be charged while they are stored and/or not in use. However, that box or container may not permit or facilitate use of the wireless earphones while they are being charged. Beneficially, FIG. 2A illustrates wireless earphone 101 inserted into a charging receptacle 200 that enables wireless earphone 101 to be charged or recharged while still being in a configuration in which earphone 101 may potentially be used by a user while it is being charged or recharged. Charging receptacle 200 includes a cavity for receiving at least a portion of earphone 101. Charging receptacle 200 is connected to a cable 201, removably or permanently, for receiving electrical power to charge or recharge earphone 101. Cable 201 comprises one or more electrical conductors and an insulating material.

Charging receptacle 200 includes an audio port 212. As illustrated in the cross sectional views of FIGS. 2B and 2C, audio port 212 provides an audio path or channel for audio element 109 from the inside of charging receptacles 200 to an outside edge, surface, or area of charging receptacle 200. Audio port 212 enables audio element 109 to continue to be utilized even though the end of wireless earphone 101 which contains audio element 109 is contained inside a cavity of charging receptacle 200. As with wireless earphone 101, audio element 109 may be near an end or extremity of wireless earphone 101 for purposes of positioning it as closely as possible to a user's mouth, for establishing spacial separation between a speaker and a microphone of the earphone, and/or for other audio improvement or enhancement purposes. However, as with wireless earphone 101, audio element 109 may be located such that is fully or partially covered when a charging apparatus is attached. Beneficially, audio port 212 permits, allows, and/or facilitates continued usage of audio element 109 when wireless earphone 101 is inserted in charging receptacle 200 and being charged.

Figure 2B:
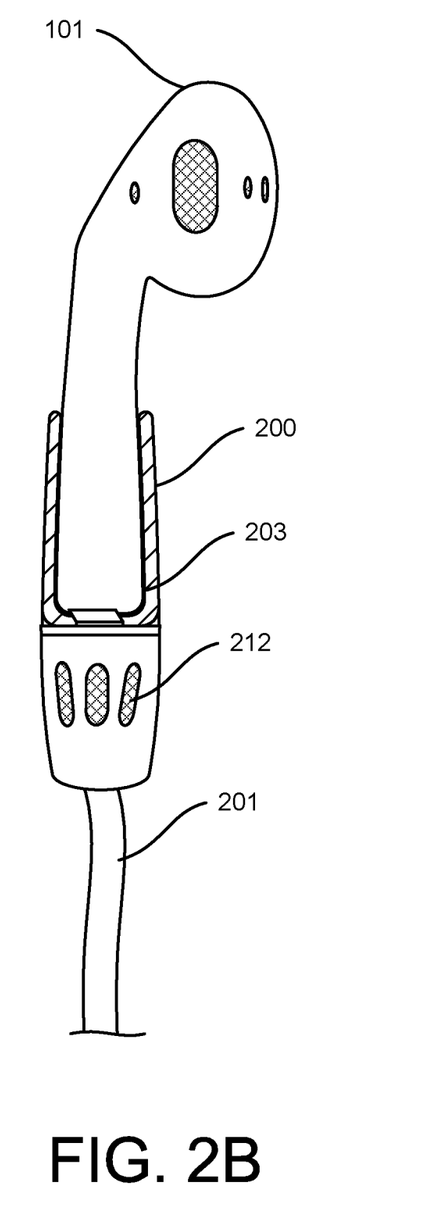
FIG. 2B illustrates a cross section of the wireless earphone of FIG. 2A inserted into the charging receptacle.
Figure 2C:
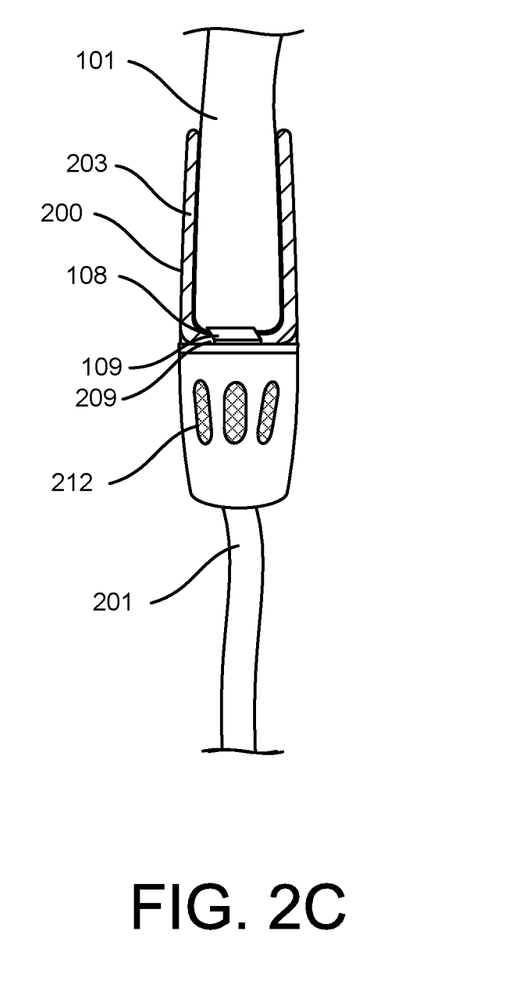
FIG. 2C illustrates a magnified view of a portion of FIG. 2B.

Audio port 212 may contain one or more holes, ports, channels, waveguides, or pathways. Audio port 212 may be an open hole or may be covered with a screen, a filter, a diaphragm, a membrane, a water impermeable membrane, and/or a combination thereof. In some examples, audio port 212 may comprise a tunnel or waveguide which extends through a portion of a wall of charging receptacle 200. In further examples, the tunnel or waveguide may be shaped or sized to provide varied or improved audio characteristics.

As illustrated in FIG. 2B, charging receptacle 200 also includes liner 203 which is comprised of a material, such as silicone, that provides a somewhat sticky or tacky surface and/or a surface that causes more friction. This type of surface allows wireless earphone 101 to be removably retained in the charging receptacle 200 without a need for additional latches, clips, or snaps. However, in some examples, a latch, clip, rotary retention mechanism, or snap may be used to removably retain wireless earphone 101 in charging receptacle 200 until it is released by a user. In other examples, wireless earphone 101 may be retained in charging receptacle using a spring loaded retaining mechanism, a twist-and-lock mechanism, a bayonet feature, a threaded feature, an interference fit, and/or another type of retaining mechanism.

As illustrated in FIG. 2C, when wireless earphone 101 is inserted into charging receptacle 200, one or more electrical contacts 108 of wireless earphone 101 contact one or more electrical contacts 209 of charging receptacle 200 to provide an electrical interconnection. This electrical interconnection permits electrical charging power from cable 201 to be delivered to wireless earphone 101 through charging receptacle 200 for charging wireless earphone 101. In some cases, data may also be communication through the same electrical contacts and/or through different electrical contacts.

Figure 3:
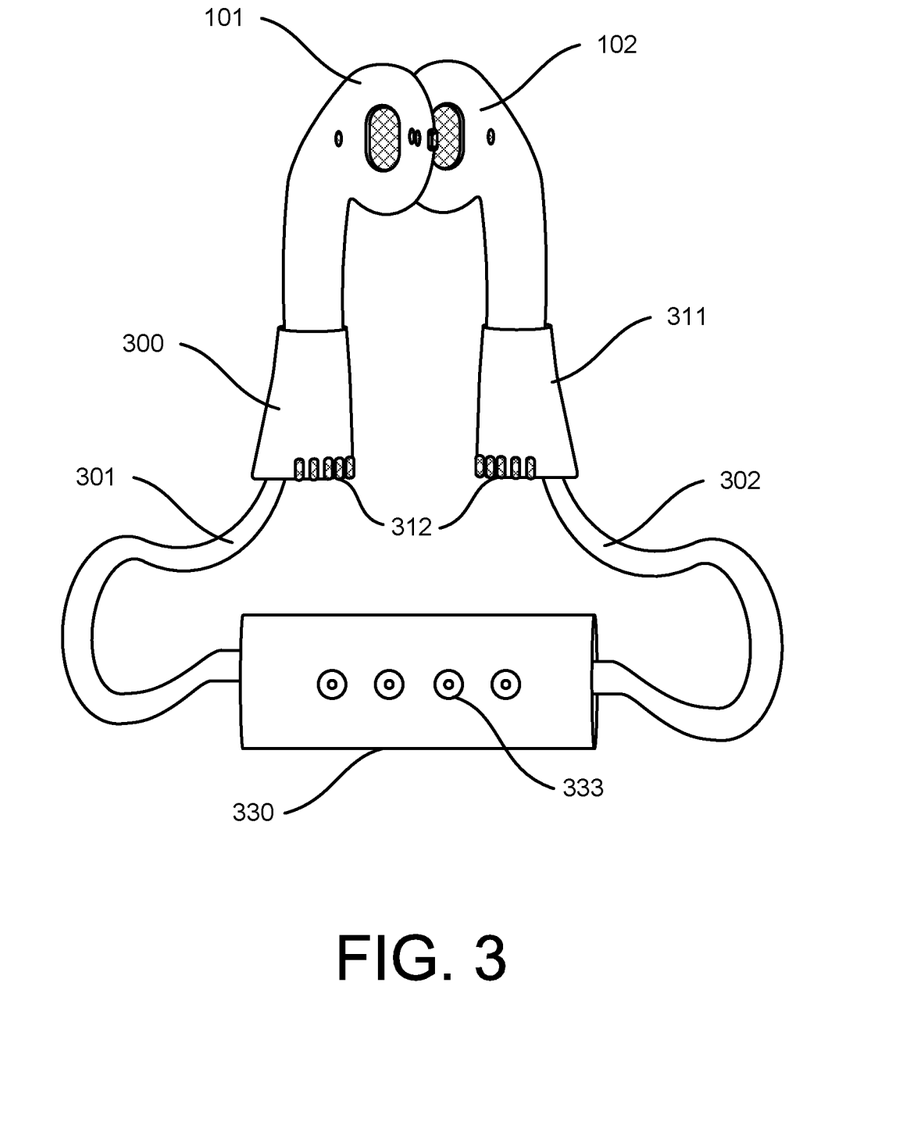
FIG. 3 illustrates a pair of wireless earphones inserted into a portable charging device.

FIG. 3 illustrates wireless earphones 101 and 102 inserted into charging receptacles 300 and 311. Charging receptacles 300 and 311 are each an example of charging receptacle 200 and may each include any of the features, functions, elements, and/or characteristics of charging receptacle 200. Charging receptacle 300 and charging receptacle 311 are attached to cable 301 and cable 302, respectively. As illustrated, cable 301 and 302 may be attached to the respective charging receptacles off-axis, or non-axially, to improve ergonomics and/or to provide an improved spacial configuration for an audio port.

Cables 301 and 302 are attached to electronics module 330. Electronics module 330 may contain electrical components, circuitry, communication components, discrete components, analog components, integrated circuits, a switch, a microprocessor, a microcontroller, non-transitory memory containing non-transitory software instructions for execution by a microprocessor or microcontroller, charging circuitry, a charge controller, and/or other components for operating and/or supplying electrical power to charging receptacles 300 and 311.

In one example, electronics module 330 includes one or more rechargeable batteries that provide stored electrical charging power to charging receptacles 300 and 311 to charge wireless earphones 101 and 102. Electronics module 330 may include an electrical connector (not illustrated) for receiving electrical power to charge the rechargeable battery(s) of electronics module 330. Electronics module 330 may also include one or more indicators 333 for indicating a status of the rechargeable battery and/or an operational mode of the device. In one example, electronics module 330 may be electrically attachable to a smartphone, which is providing audio data to wireless earphones 101 and 102, for purposes of charging or recharging a rechargeable battery of electronics module 330 and/or wireless earphones 101 and 102 from the smartphone.

Electronics module 330 may also contain communication components for exchanging data communications, or otherwise communicating with wireless earphones 101 and 102 and/or with another electronic device, such as a smartphone sending data to wireless earphones 101 and 102. The communication between electronics module 330 and one or more other devices may occur through a wired connection and/or wirelessly. Charging receptacles 300 and 311 each include an audio port 312. Audio ports 312 are each an example of and may include any of the features, functions, elements, and/or characteristics of audio port 212 for purposes of facilitating or permitting use of an audio feature of wireless earphone 101 or 102 when inserted into charging receptacle 300 and 311, respectively.

Beneficially, the charging apparatus of FIG. 3 keeps wireless earphones 101 and 102 together when they are being charged to reduce likelihood of misplacing one or both of them and also allows them to be charged from a single battery, power source, or module. Further, cable 301 and 302 may have lengths that make it convenient for the whole assembly to hang or loop around a user's neck such that wireless earphones 101 and 102 can conveniently be used even when attached to the charging apparatus (also see FIG. 5). A user can conveniently continue to use the wireless earphones or headphones while they are being charged and then remove the charging apparatus and return to a completely wireless configuration when the wireless earphones or headphones have been recharged. This may particularly useful when the earphones have relatively short battery lives and need to be recharged more frequently than the electronic device they are being used with and/or during the day. Beneficially, the user can use the earphones in either an unconnected mode or in a connected (charging) mode.

In some situations, a cord or cable, similar to cable 301 and/or cable 302 may be used only for physically retaining the wireless earphones and may not necessarily provide an electrical or charging function. In other situations, an apparatus similar to that illustrated in FIG. 3 may include an electrical connector for interfacing to and providing power to a charging box or charging pod for one or more wireless earphones of the type described herein.

Figure 4:
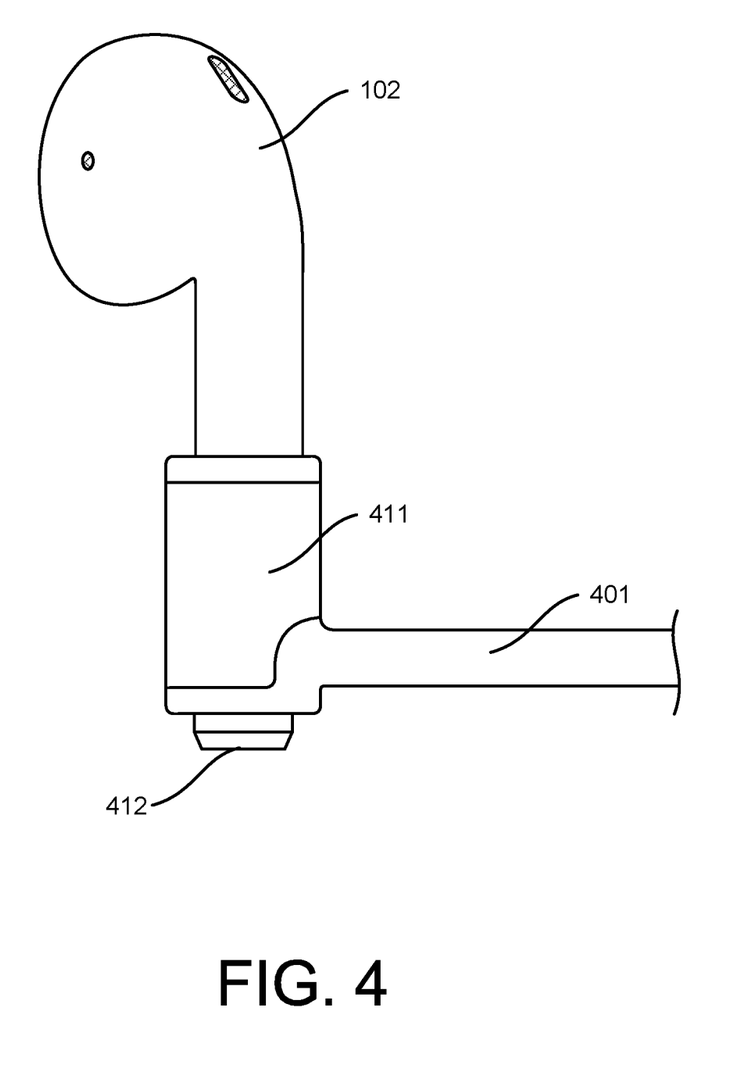
FIG. 4 illustrates a wireless earphone inserted into a charging receptacle.

FIG. 4 illustrates wireless earphone 102 removably inserted into a charging receptacle 411. Charging receptacle 411 is an example of and may include any of the features, functions, elements, and/or characteristics of charging receptacle 200, charging receptacle 301, and/or charging receptacle 311. Charging receptacle 411 includes audio port 412. Audio port 412 is an example of and may include any of the features, functions, elements, and/or characteristics of audio port 212 or audio port 312 for purposes of facilitating or permitting use of an audio feature of wireless earphone 102 when it is inserted into charging receptacle 411.

Cable 401 is an example of and may include any of the features, functions, elements, and/or characteristics of cable 201, cable 301, and/or cable 302. Cable 401 is attached to charging receptacle 411 at a significant angle relative to an axis of charging receptacle 411, which may be a substantially perpendicular angle or an approximately 90 degree angle, to potentially improve ergonomics of the assembly when wireless earphone 102 is inserted in an ear of a user. Earphone 102 may be designed to hang in a generally downward direction from a user's ear when used fully wirelessly. Therefore, the configuration illustrated in FIG. 4 may be beneficial because it tends to position cable 401 such that it can easily be looped around the user's neck without significantly affecting the preferred state or orientation of earphone 102. Cable 401 may also be attached to an electronics module and/or to another cable and charging receptacle as in FIG. 3.

Figure 5:
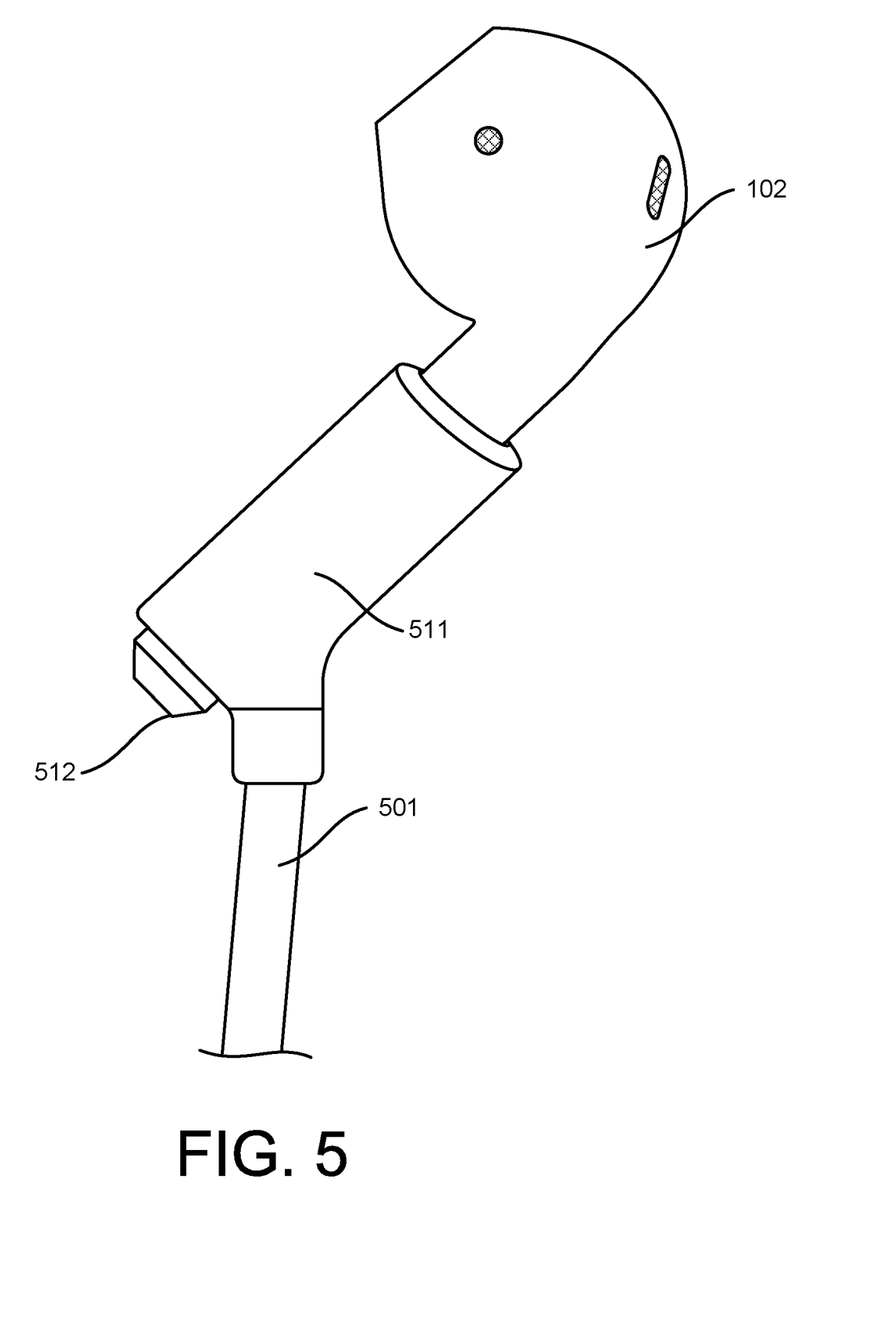
FIG. 5 illustrates a wireless earphone inserted into a charging receptacle.

FIG. 5 illustrates wireless earphone 102 inserted into a charging receptacle 511. Charging receptacle 511 is an example of and may include any of the features, functions, elements, and/or characteristics of charging receptacle 200, charging receptacle 301, charging receptacle 311, and/or charging receptacle 411. Charging receptacle 511 includes audio port 512. Audio port 512 is an example of and may include any of the features, functions, elements, and/or characteristics of audio port 212 and/or audio port 412.

Cable 501 is an example of and may include any of the features, functions, elements, and/or characteristics of cable 201, cable 301, cable 302, and/or cable 401. Cable 501 is attached to charging apparatus 511 at an angle which is less than a perpendicular angle or a 90 degree angle relative to an axis of charging receptacle 511, but also greater than zero with respect to the axis. This positioning and angle potentially improve ergonomics of the assembly when wireless earphone 102 is inserted in an ear of a user. Cable 501 may be attached to an electronics module and/or to another cable and charging receptacle as in FIG. 3.

Any of the charging apparatuses or cables disclosed herein may also include a clip or other attachment apparatus to removably securing the assembly to another object, such as to a piece of clothing. A clip or other attachment apparatus may reduce chances of misplacing the assembly and/or minimize the movement of the when a user is moving or exercising. The clip may be constructed from a stiff, but flexible, material such as plastic or metal. The clip may also include an attachment surface which includes a sticky material, a tacky material, a rough material, and/or a material having a high coefficient of friction to reduce the chances of the clip accidentally sliding off or coming off of an object is has been temporarily attached to. In other examples, the clip may comprise a spring loaded attachment feature, a magnetic attachment feature, a hook and loop attachment feature, a snap attachment feature, and/or another type of attachment feature for removably and temporarily attaching any of the disclosed apparatuses to another item.

Figure 6A:
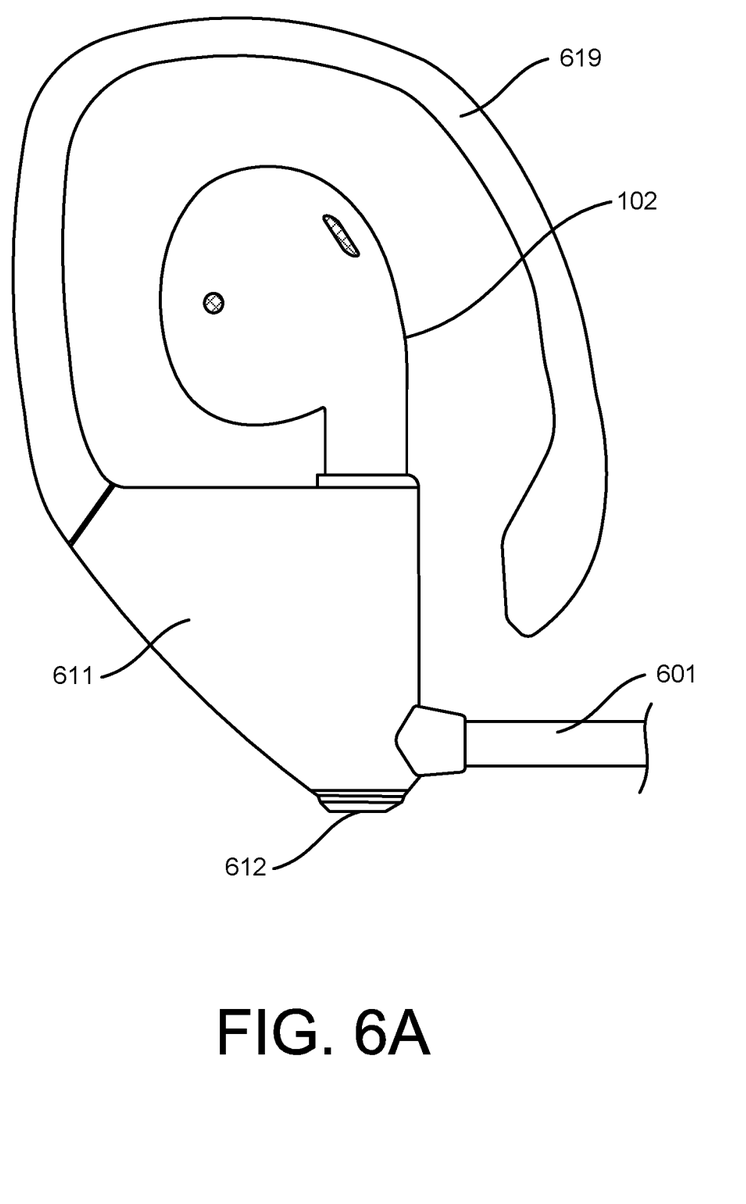
FIG. 6A illustrates a wireless earphone inserted into a charging receptacle.

FIG. 6A illustrates wireless earphone 102 inserted into a charging receptacle 611. Charging receptacle 611 is an example of and may include any of the features, functions, elements, and/or characteristics of charging receptacle 200, charging receptacle 301, charging receptacle 311, charging receptacle 411, and/or charging receptacle 511. Charging receptacle 611 includes audio port or audio channel 612. Audio port 612 is an example of and may include any of the features, functions, elements, and/or characteristics of audio port 212, audio port 412, and/or audio port 512. Charging receptacle 611 is attached to and/or includes retention feature 619 for keeping charging receptacle 611 in place on an ear of a user. Retention feature 619 may have one or more of a variety of shapes or features which keep the apparatus in place on or near an ear of a user, particularly during movement, running, sports, or exercise. In some situations, retention feature 619 may be adjustable. In other situations, retention feature 619 may be removable and/or may be replaceable with a retention feature of a different size or shape.

Cable 601 is attached to charging receptacle 611 and is an example of and may include any of the features, functions, elements, and/or characteristics of cable 201, cable 301, cable 302, cable 401, and/or cable 501. Cable 601 may be attached to an electronics module, to another cable, and/or to another charging receptacle as illustrated in FIG. 3.

Figure 6B:
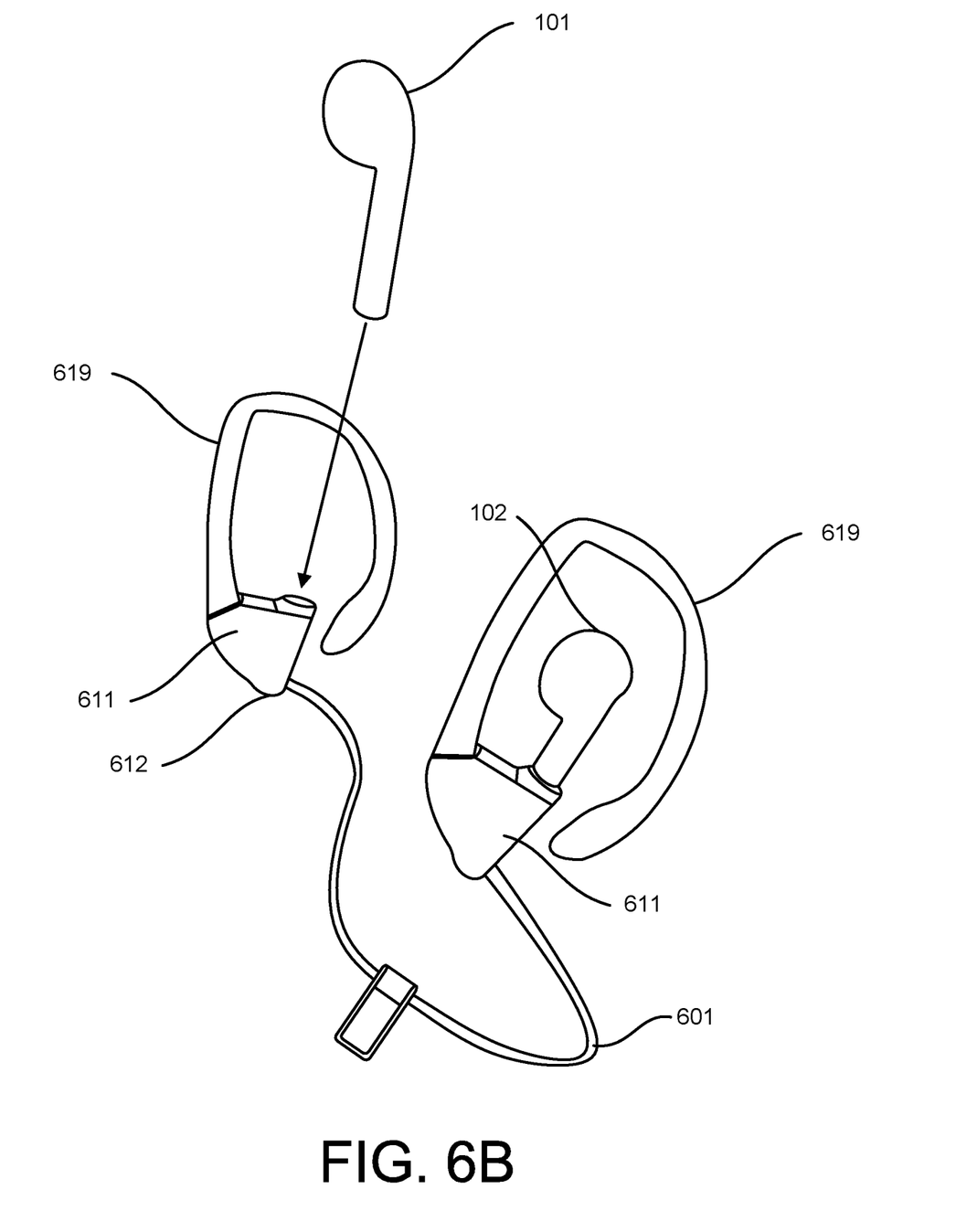
FIG. 6B illustrates a pair or wireless earphones and a charging apparatus.

FIG. 6B illustrates a second charging receptacle 611 attached to the first charging receptacle of FIG. 6A with cable 601. In this example, either the first charging receptacle 611, the second charging receptacle 611, or both, may contain some or all of the battery, electronics, circuitry, visual indicators, or other components discussed herein.

The elements, components, and steps described herein are meant to exemplify some types of possibilities. In no way should the aforementioned examples limit the scope of the invention, as they are only exemplary embodiments.

The phrases "in some embodiments," "according to some embodiments," "in the embodiments shown," "in other embodiments," "in some examples," "in other examples," "in some cases," "in some situations," "in one configuration," "in another configuration," and the like generally mean that the particular technique, feature, structure, or characteristic following the phrase is included in at least one embodiment of the present invention and/or may be included in more than one embodiment of the present invention. In addition, such phrases do not necessarily refer to the same embodiments or to different embodiments.

The foregoing disclosure has been presented for purposes of illustration and description. Other modifications and variations of the disclosed techniques may be possible in view of the above teachings. The embodiments described herein were chosen to explain the principles of the concept and its practical application to enable others skilled in the art to best utilize the invention. It is intended that the claims be construed to include other alternative embodiments of the invention, except as limited by the prior art.

What is claimed is:

1. A charging apparatus for wireless earphones, the charging apparatus comprising:
   a rechargeable battery for storing electrical power;
   a first electrical cable;
   a first charging receptacle electrically connected to the rechargeable battery by the first electrical cable, the first charging receptacle including a cavity configured for receiving at least a portion of a first one of the wireless earphones when the first one of the wireless earphones is installed in the first charging receptacle, the first charging receptacle further including first electrical contacts electrically connected to the first electrical cable, the first electrical contacts configured to electrically interface to electrical contacts of the installed first wireless earphone, the first charging receptacle further including a first audio waveguide path between an outer surface of the first charging receptacle and an inner surface of the cavity of the first charging receptacle;
   a second electrical cable; and
   a second charging receptacle electrically connected to the rechargeable battery by the second electrical cable, the second charging receptacle including a cavity configured for receiving at least a portion of a second one of the wireless earphones when the second one of the wireless earphones is installed in the second charging receptacle, the second charging receptacle further including second electrical contacts electrically connected to the second electrical cable, the second electrical contacts configured to electrically interface to electrical contacts of the installed second wireless earphone, the second charging receptacle further including a second audio waveguide path between an outer surface of the second charging receptacle and an inner surface of the cavity of the second charging receptacle.

2. The charging apparatus of claim 1 further comprising a visual status indicator for indicating a status of the rechargeable battery.

3. The charging apparatus of claim 1 further comprising an electrical connector for connecting the charging apparatus to an external power source for recharging the rechargeable battery.

4. The charging apparatus of claim 1 further comprising wireless charging circuitry for wirelessly receiving electrical power source for recharging the rechargeable battery.

5. The charging apparatus of claim 1 further comprising a clip for removably attaching the charging apparatus to a piece of clothing.

6. The charging apparatus of claim 5 wherein the clip is spring loaded.

7. The charging apparatus of claim 1 wherein an opening of the first audio waveguide path is covered with a screen proximate the outer surface of the first charging receptacle.

8. The charging apparatus of claim 1 wherein the cavities each include a silicone liner for removably retaining the respective wireless earphones in the cavity.

9. The charging apparatus of claim 1 wherein the first charging receptacle includes a plurality of audio waveguide paths.

10. The charging apparatus of claim 1 further comprising a first retention apparatus attached to the first charging receptacle, the first retention apparatus configured for removably attaching the first charging receptacle proximate an ear of a user.

11. The charging apparatus of claim 10 further comprising a second retention apparatus attached to the second charging receptacle.

12. The charging apparatus of claim 10 wherein the first retention apparatus is removable from the first recharging receptacle.

13. The charging apparatus of claim 1 further comprising communication circuitry for exchanging data communications with an electronic device.

14. The charging apparatus of claim 13 wherein the communication circuitry includes wireless communication circuitry configured for conducting wireless communications.

15. A charging apparatus for a pair of wireless earphones, the charging apparatus comprising:
   a rechargeable battery for storing electrical power;
   two charging receptacles, each of the two charging receptacles adapted for receiving a respective one of the pair of wireless earphones, each charging receptacle comprising:
      a cavity for receiving at least a portion of the respective one of the pair of wireless earphones;
      electrical contacts for contacting and electrically interfacing to the respective wireless earphone when the wireless earphone is in the cavity of the charging receptacle; and
      an audio port adapted to provide a path for sound to travel to and/or from an audio element of the respective wireless earphone when the earphone is in the cavity of the charging receptacle, the path extending from an inside surface of the cavity to an outside surface of the charging receptacle; and
   one or more electrical cables connected to the charging receptacles and to the rechargeable battery, the one or more electrical cables adapted for electrically connecting the electrical contacts of each charging receptacle to the rechargeable battery to provide at least a portion of the stored electrical power from the rechargeable battery to each of the wireless earphones when in the charging receptacles.

16. The charging apparatus of claim 15 wherein the audio port comprises a channel extending from an opening at the inside surface of the cavity to the charging receptacle, wherein the opening at the inside surface of the cavity is adapted to be proximate a microphone of the respective wireless earphone when the wireless earphone is in the cavity of the charging receptacle.

17. The charging apparatus of claim 16 further comprising a membrane that spans the channel, wherein the membrane is water impermeable.

18. The charging apparatus of claim 15 further comprising electrical circuitry and one or more visual status indicators for indicating a status of at least one of the charging apparatus and the rechargeable battery.

19. The charging apparatus of claim 15, the cavity of the charging receptacle having an axis along which the wireless earphone is received into the cavity, wherein the electrical cable attached to the charging receptacle extends from the charging receptacle at an angle that is not parallel to the axis of the cavity.

20. The charging apparatus of claim 19 wherein the angle of the electrical cable is 90 degrees relative to the axis of the cavity.

\* \* \* \* \*